(12) United States Patent
Taylor et al.

(10) Patent No.: US 9,953,384 B2
(45) Date of Patent: Apr. 24, 2018

(54) AUTOMATED DIGITAL DISCOVERY WITH CURRENT STREAMING

(71) Applicant: IPRO TECH, LLC, Phoenix, AZ (US)

(72) Inventors: Kimothy Taylor, Phoenix, AZ (US);
Michael Schubert, Phoenix, AZ (US);
Jason Turnage, Gilbert, AZ (US)

(73) Assignee: iPro Tech, LLC, Tempe, AZ (US)

( * ) Notice: Subject to any disclaimer, the term of this patent is extended or adjusted under 35 U.S.C. 154(b) by 498 days.

(21) Appl. No.: 14/698,663

(22) Filed: Apr. 28, 2015

(65) Prior Publication Data

US 2016/0321767 A1 Nov. 3, 2016

(51) Int. Cl.
*G06F 17/30* (2006.01)
*G06Q 50/18* (2012.01)

(52) U.S. Cl.
CPC ....... *G06Q 50/18* (2013.01); *G06F 17/30011* (2013.01); *G06F 17/30312* (2013.01); *G06F 17/30557* (2013.01); *G06F 17/30867* (2013.01)

(58) Field of Classification Search
CPC ......... G06F 17/30011; G06F 17/30557; G06F 17/30867; G06F 17/30312; G06Q 50/184
USPC ................................................. 707/741, 603
See application file for complete search history.

(56) References Cited

U.S. PATENT DOCUMENTS

| | | | | |
|---|---|---|---|---|
| 7,761,427 B2 * | 7/2010 | Martin | .................... | G06Q 10/10 707/661 |
| 8,645,401 B2 * | 2/2014 | Williams | .......... | G06F 17/30893 707/754 |
| 8,903,826 B2 * | 12/2014 | Richards | ................ | G06Q 10/06 707/737 |
| 9,053,454 B2 * | 6/2015 | Mayer | .................... | G06Q 10/06 707/609 |
| 2009/0150168 A1 * | 6/2009 | Schmidt | ................. | G06Q 10/10 705/311 |
| 2011/0320494 A1 * | 12/2011 | Fisher | ............... | G06F 17/30011 707/780 |
| 2012/0265762 A1 * | 10/2012 | Wade | ................... | G06Q 50/184 707/741 |

* cited by examiner

*Primary Examiner* — Shahid Alam
(74) *Attorney, Agent, or Firm* — Snell & Wilmer L.L.P.

(57) ABSTRACT

A method and system is provided to improve the throughput and processing time of ediscovery by breaking batches of electronically stored information (ESI) into individual documents or related pieces of ESI, and allowing the individual documents or pieces of ESI to proceed or stream to a subsequent stage in the ediscovery process while other documents or pieces of ESI are still completing earlier stages in the process. The system provides for tracking evidence media and file processing, which includes copying, extraction of documents from container files, document meta-data extraction, text extraction, text indexing, data culling, and transmittal to document review systems, with streaming system throughput and substantially less human intervention which will substantially reduce wait time and human labor.

12 Claims, 17 Drawing Sheets

☑ Auto-data Loading Enabled

○ Occurs once at:

● Occurs every: 1 ⇕ Hour(s)    Starting at: 12:00 AM ⊕    Ending at: 11:59 PM ⊕

AUTOMATED DIGITAL DISCOVERY WITH CURRENT STREAMING

FIELD OF THE INVENTION

The present invention in general relates to the field of document management and in particular to a platform for electronic discovery of media content.

BACKGROUND OF THE INVENTION

Electronic discovery (hereinafter ediscovery) generally refers to an electronic process and system for identifying, collecting, and producing electronically stored information (ESI) in response to a request for production in a law suit or investigation. EST includes, but is not limited to, emails, documents, presentations, databases, voicemail, audio and video files, social media, and web sites.

The processes and technologies involved in ediscovery are often complex because of the sheer volume of electronic data produced and stored. Additionally, unlike hardcopy evidence, electronic documents are more dynamic and often contain metadata such as time-date stamps, author and recipient information, and file properties. Preserving the original content and metadata for electronically stored information is required in order to eliminate claims of spoliation or tampering with evidence later in a litigation or investigative process.

During a legal or other investigative process, once data is identified by the parties on both sides of a matter, potentially relevant documents (including both electronic and hardcopy materials) are placed under a legal hold, and the relevant documents/data cannot be modified, deleted, erased, or otherwise destroyed. Potentially relevant data is collected and then extracted, indexed, and placed into a database. The potentially relevant data in the database is then further analyzed to cull or segregate the clearly non-relevant documents and e-mails. The data is then hosted in a secure environment and made accessible to reviewers who code the documents for their relevance to the legal or investigative matter.

In ediscovery, the relevant documents may be converted to a static format such as tagged image file format (TIFF) or portable document format (PDF), making redaction of privileged and non-relevant information possible. The use of computer assisted review (also known as "C.A.R." or Technology Assisted Review, "T.A.R."), predictive coding, and other analytic software for e-discovery reduces the number of documents required for review by attorneys, and allows the legal or investigative team to prioritize the documents it does review. The reduction in the number of documents cuts the number of hours reviewing documents and thus labor costs. The ultimate goal of ediscovery is to produce a core volume of evidence for litigation or investigations in a defensible manner.

Existing ediscovery processes typically require numerous people, computer systems, and software systems for the management and execution of data collection, data processing, preparing for attorney document review, and production of electronically stored information for investigations, audits, litigation, or other legal purposes. Disparate, loosely connected, complex software systems and human interactions are necessary to execute the ediscovery process. The complexity, lack of workflow, and integration between systems and processes in existing ediscovery processes is responsible for enormous delays, frustration, and quality issues.

The typical workflow in existing ediscovery processes are long-running, requiring humans to watch for stages of process completion, and manually having to shuttle data to the next step or software package to continue the process, and continue to move the data to its end point. The existing ediscovery process often requires hiring several shifts of technical employees to enable this manual process to be performed without long interruptions. It is also typical that work for multiple projects may be performed concurrently for different parties of interest, with differing project requirements, priorities and deadlines. Delays are exponentially increased while the data waits to be moved manually to the next step in the process while the human employee is busy with a competing project.

FIG. 1 is a flow diagram showing a graphical representation of an existing ediscovery process 10 with stopping points (S) requiring human (H) user interactions to manually restart the process between process stages 1 to stage 8. At stage 1, a storage medium 12 with electronically stored information (ESI) is received from an end user to undergo ediscovery processing. The media 12 is logged into a chain of custody tool, and a report is then generated about the data received in the shipment. The report will be used to ascertain which files to copy to the network for ediscovery processing. Depending on the client's instructions with respect to the contents of the drive, a technician will copy data from the media to a file server 14. The data copied to the file server 14 is typically the data that has been requested to be processed by the client. Technicians typically use third party copy technology to copy the data to the file server 14. The file copy process is a batch (B) process that requires the copy to fully complete before the next stage in the ediscovery process can be started. Therefore, this process is serial to data processing, and all data must finish copying before the processing stage can begin. The serial nature of the data transfer during the copying stage introduces a data processing delay, and a human intervention step once copying is complete, as shown by the stop sign (S). Secondly, a record of this data transfer and its relationship to the media and the legal matter, must be created at another manual step in yet another separate software system.

Following the completion of the data transfer/copying to the file server 14; the technician at stage 2 must perform another manual step to confirm that all of the data selected to copy actually copied to the file server. The technician may conduct the confirmation process by looking at robocopy logs or by doing a full folder compare using additional software tools 16 illustratively including Beyond Compare by Scooter Software, inc. Once verification of a successful copy process of the required data is obtained, all of the transferred data on the file server 14 can move to the next stage. The transfer/copying process is also serial to data processing and must be done before ediscovery processing can begin, introducing an additional data processing delay, and a human intervention step once copying is completed.

With the data on the file server now ready for ediscovery processing, the technician at stage 3 sets up ediscovery processing jobs using ediscovery software tools. The technician selects individual folders on the file server, and these folders are mapped to jobs to begin data processing. Each job is a batch of data that is processed together. At stage 4, data processing occurs with a selected ediscovery tool 18. All files are broken down into individual documents. Files inside of archives are extracted to disk as individual files. Files inside of mail databases are extracted out into individual files; this includes copying out attachments separate from the email. After all files are extracted to disk, metadata and text are extracted from the individual documents. This extracted information is loaded into the processing database for further formatting. Once all files have been processed the batch of data moves onto the next step. These monolithic batches of data must be completed in their entirety before being manually exported from storage for transmittal to external document review systems. This creates a document review delay and introduces an additional human intervention step. At stage 5 a manual error remediation process is performed that requires the technician to remediate all errors before moving all of data in a batch to the next stage. All of the data in the batch will wait for the technician to look for errors that occurred during processing even though the error documents are a very small percentage of the overall document population. The technician will look at all extraction errors and attempt to remediate as many processing errors as possible. Once all errors have been remediated the technician will send the entire batch of data on to the next stage.

Continuing with the ediscovery process of FIG. 1, once the entire batch (B) of data has been quality controlled (QC'ed) for data processing errors (stage 5), the batch (B) of data is ready for filtering at stage 6. The technician applies filters 20 to the batch (B) of data to create an export set 22 of documents. The filters 20 that are applied at this time include but are not limited to de-duplication, date, file type, file extension, and keyword searching. The application of filters 20 is a manual step causing stoppage of work until configuration and execution by a user prompts the software to continue to the export/transmittal to storage or review systems.

At stage 7, after all errors have been remediated for the entire batch and filters have been applied the technician exports the data for load into a review product. Export will put the each document 22 out on the file server so that the documents 22 may be viewed in the review product. The ediscovery software also produces a metadata load file, and the extracted text for each file it outputs to disk. The technician must QC the exported data 22 after completion to ensure that no errors were encountered. If errors occurred the export will need to be redone in its entirety. At stage 8, data 22 is manually loaded (imported) into the review platform using load files. The entire filtered batch or many filtered batches will be loaded at one time. After load completion the technician completes a QC of the data load to ensure it was done correctly.

Thus while ediscovery can be an effective tool there exists a need for a method and system to improve the ediscovery process that streamlines the process and makes ediscovery less labor intensive and time consuming.

SUMMARY OF THE INVENTION

A computer-implemented method for electronic discovery processing, including executing on a processor the steps of receiving a set of electronic discovery project requirements and filter requirements; reading an attached storage medium, and copying a selection of electronically stored information (ESI) from the attached storage medium to a data processing file storage of a file server; wherein as individual subdirectories of the selection of ESI complete the copy process, the individual subdirectories are inserted in parallel into an ediscovery processing job that is performed by a discovery worker service/automated digital discovery module; and wherein the ediscovery processing begins and is performed concurrently while the copying is performed.

A non-transitory computer readable medium for electronic discovery processing, including instructions stored thereon, that when executed on a processor, perform the steps of: receiving a set of electronic discovery project requirements and filter requirements; reading an attached storage medium, and copying a selection of electronically stored information (ESI) from the attached storage medium to a data processing file storage of a file server; wherein as individual subdirectories of the selection of ESI complete the copy process, the individual subdirectories are inserted in parallel into an ediscovery processing job that is performed by a discovery worker service/automated digital discovery module; and wherein the ediscovery processing begins and is performed concurrently while the copying is performed.

A system for ediscovery, the system including: a computer server networked to one or more computing devices, where the computer server is configured to run a non-transitory computer readable medium for electronic discovery processing, including instructions stored thereon, that when executed on a processor, perform the steps of: receiving a set of electronic discovery project requirements and filter requirements; reading an attached storage medium, and copying a selection of electronically stored information (ESI) from the attached storage medium to a data processing file storage of a file server; wherein as individual subdirectories of the selection of ESI complete the copy process, the individual subdirectories are inserted in parallel into an ediscovery processing job that is performed by a discovery worker service/automated digital discovery module; and wherein the ediscovery processing begins and is performed concurrently while the copying is performed.

BRIEF DESCRIPTION OF THE DRAWINGS

The present invention is further detailed with respect to the following drawings. These figures are not intended to limit the scope of the present invention but rather illustrate certain attributes thereof in which like reference numerals indicate similar elements.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

FIGS. 8A-8D are a series of screenshots of the GUI showing that allow a user to set up data export options for exporting data to external locations or software in accordance with embodiments of the invention;

FIG. 9 shows a media manager application interface display for logging and tracking media related to evidence data used in the streaming ediscovery process for facilitating an automated workflow in accordance with embodiments of the invention;

FIG. 11 shows a screenshot of an interface for configuring the auto-load interval for data to the document review system in accordance with embodiments of the invention;

Figure 12:
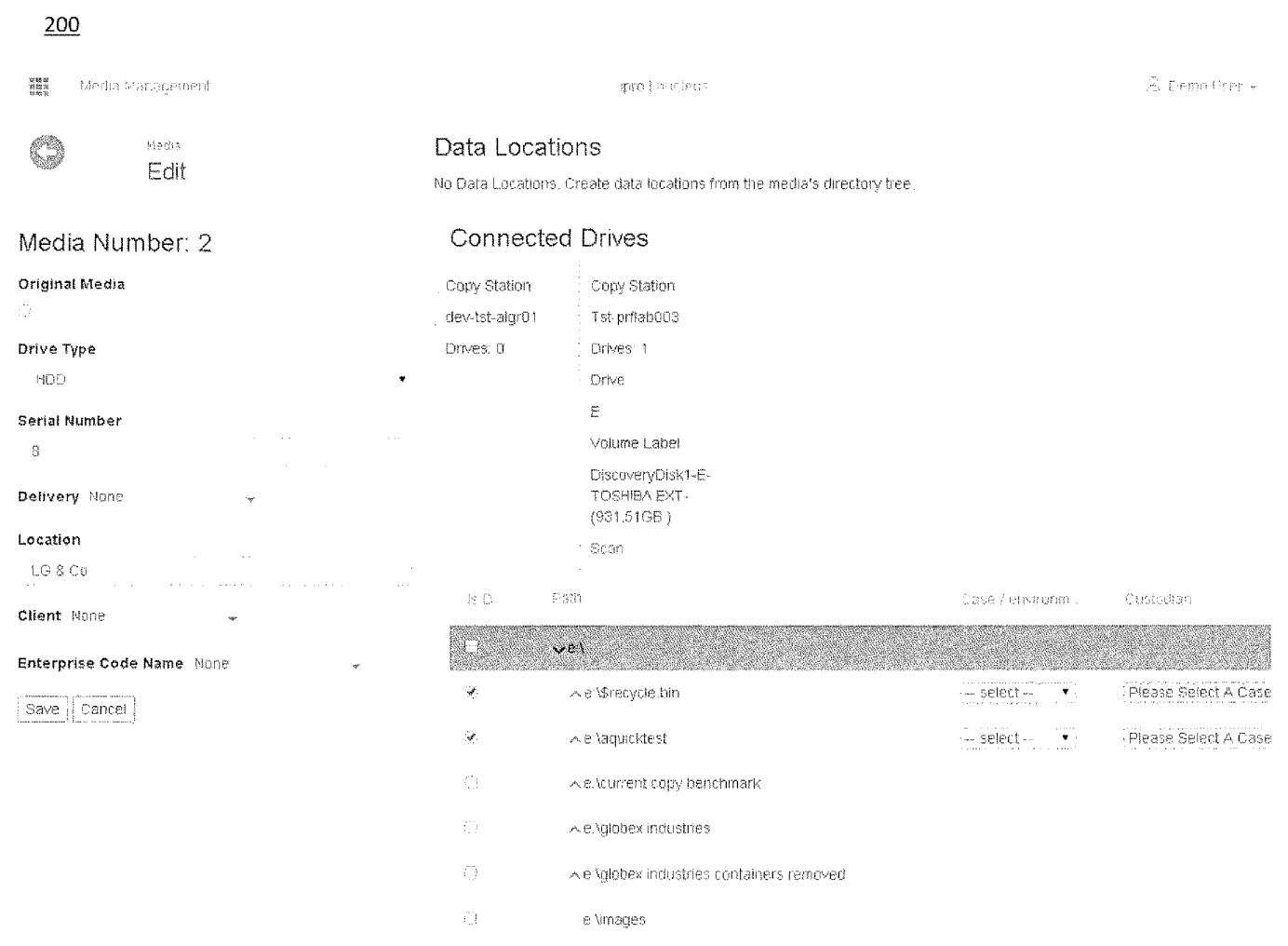

FIG. 12 shows a screenshot for an interface for selecting data for parallel copying and streaming data processing, and for export/transmittal to storage or document review systems in accordance with embodiments of the invention.

DESCRIPTION OF THE INVENTION

The present invention has utility as a method and system to improve the throughput and processing time of ediscovery by breaking batches of electronically stored information (ESI) into individual documents or related pieces of ESI, and allowing the individual documents or groups of related pieces of ESI to proceed or stream to a subsequent stage in the ediscovery process while other documents or other groups of related pieces of ESI are still completing earlier stages in the process. Embodiments of the present invention provide a system for tracking evidence media and file processing, which includes copying, extraction of documents from container files, document meta-data extraction, text extraction, text indexing, data culling, and transmittal to document review systems, with streaming system throughput and substantially less human intervention that substantially reduces wait time and human labor. Embodiments of the inventive streaming software provide high levels of process automation and technology to stream results forward through all steps in the ediscovery process, to the end point of the process, in a very expeditious manner, without stoppages and human intervention that are now part of existing ediscovery. The ability to stream individual documents and pieces of ESI, without stoppages and human intervention, greatly increase throughput, reduce delays, and reduce the human effort needed to perform the ediscovery process.

Figure 1:
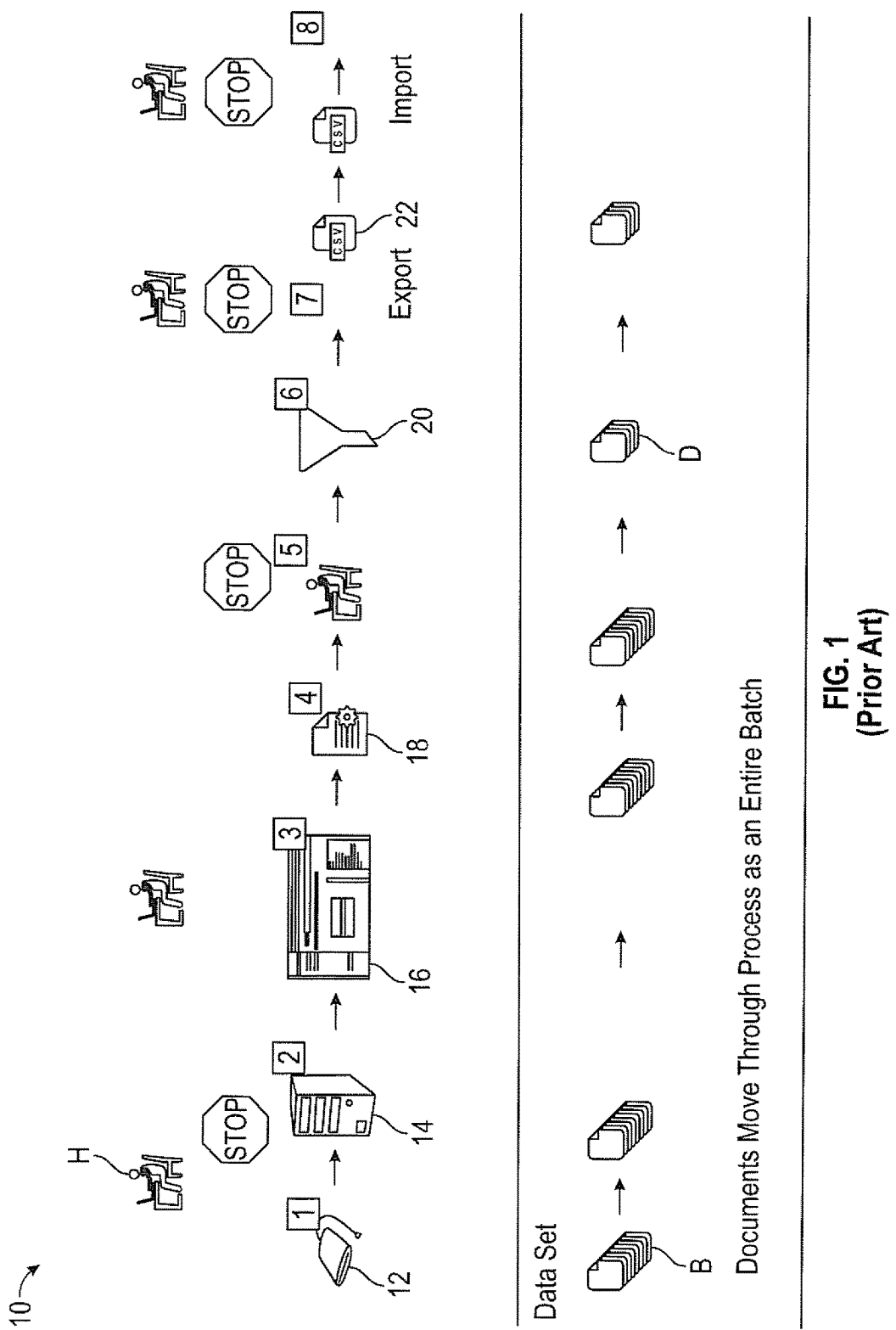
FIG. 1 is a flow diagram showing a graphical representation of an existing ediscovery process with stopping points requiring human user interactions to manually restart the process between process stages.
Figure 2:
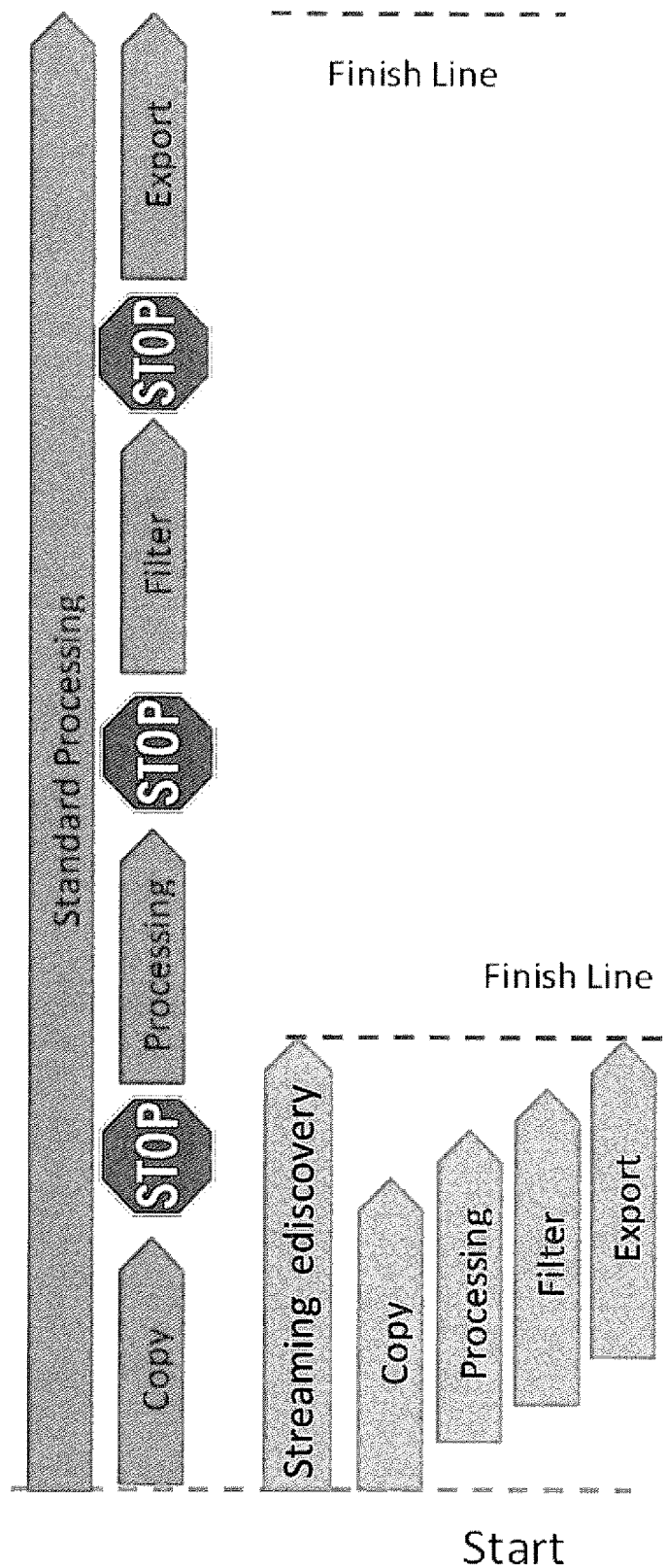
FIG. 2 is a graphical representation that contrasts the automated, streaming and parallel nature of the inventive streaming ediscovery process with the serial, and manual process in an existing ediscovery system.

Embodiments of the inventive streaming ediscovery provide a system for managing media containing electronic evidence, entering project specifications necessary to complete the ediscovery process, remotely copying data directly from evidence media to the processing systems while simultaneously processing the data in parallel with the copy process, and transporting the results to the document review environment without human intervention, as well as provide the ability to perform quality inspection and repair of the processing results. FIG. 2 is a graphical representation that contrasts the automated, streaming and parallel nature of the inventive streaming ediscovery process with the serial and manual process in an existing ediscovery process as described in FIG. 1. It should be noted from FIG. 2 that the inventive streaming ediscovery process has a shorter processing time then existing ediscovery processes without the process stoppages and continuous human interventions.

In a specific embodiment of the ediscovery streaming system provided by the Assignee Ipro Tech, Inc (Phoenix, Ariz.), which will be described further below in conjunction with FIGS. 3-13 may include a copy station computer where the evidence media is connected and related data are managed by the user, and an inventive version of the streaming eDiscovery software system containing the copy, queue manager and scheduler, discovery worker service/automated digital discovery (ADD), QC module, and a media management system.

Figure 3:
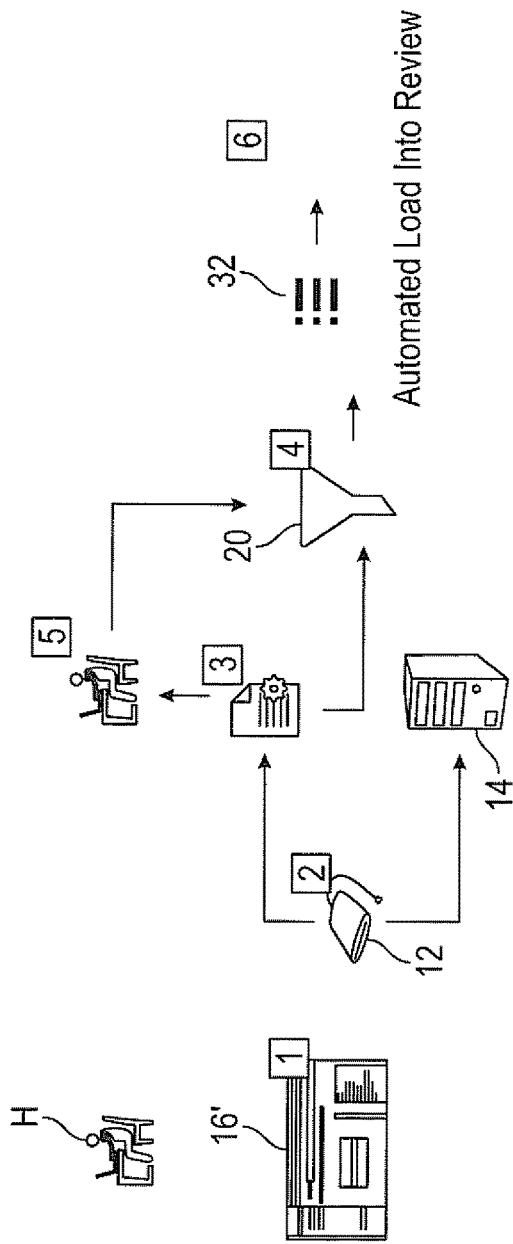
FIG. 3 is a flow diagram showing a graphical representation of a streaming ediscovery process in accordance with an embodiment of the invention.
Figure 3:
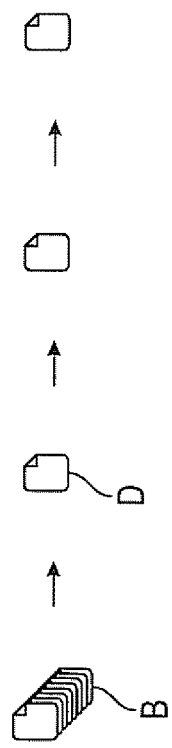
Figure 4:
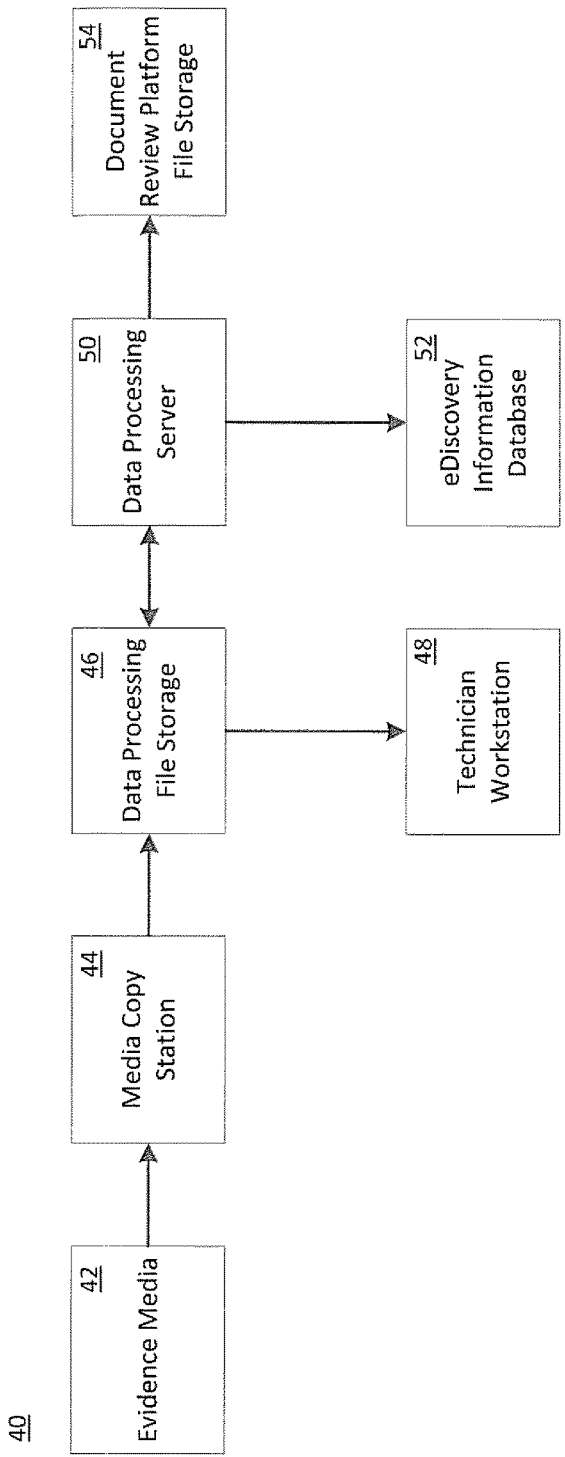
FIG. 4 is a block diagram demonstrating the physical movement of data across physical computer locations in accordance with embodiments of the invention.

FIG. 3 is a flow diagram showing a graphical representation of a streaming ediscovery process 30 in accordance with an embodiment of the invention. During the first stage, a technician sets up a streaming ediscovery project and filter requirements up front, prior to introducing the storage media for copying using the media manager application 16', and is shown in FIG. 4 as software function block 62. The setup will include the streaming ediscovery processing settings, filtering settings, and export settings. The upfront settings are inputted by the technician using a graphical user interface screens shown in FIGS. 6A, 6B, 7A, 7B, and 8A-8D that are described below. Setting up the streaming process up front allows for the streaming automation and removes work stoppages while waiting on humans for input as was shown in FIG. 1 for the existing ediscovery process. At stage 2, the processing group receives media 12 from end user. The media 12 is logged and registered into the media manager application 16' for chain of custody tracking. A report is then generated about the data received in the shipment. The report will be used to ascertain which files to copy to the data processing file storage (FIG. 4, block 46) for processing. Following deliberation with the client about requirements the process will start. The technician will select the data to process that was agreed upon with the client in the media manager application 62. Media Manager 62 sends a request to the copy service 64 to copy the data. The copy service 64 will copy the data to the data processing file storage 46 on the file server 14. As subdirectories complete the copy process the subdirectories are inserted in parallel into an ediscovery processing job for the discovery worker service/automated digital discovery (FIG. 5, block 68) to begin work.

During stage 3, data processing occurs within the discovery worker service/automated digital discovery 68. Data processing is carried out concurrently while files are copied to the file server 14 by the copy service 64. Embodiments of the discovery worker service/automated digital discovery 68 take the subdirectories of the inputted data, and breaks the subdirectories into smaller tasks called group tasks. The group tasks will extract files to the data processing file storage 46, extract metadata, and extract document text. This extracted data is written to the ediscovery information database 52 and data processing file storage 46 of the fileserver 14. The size of the group task is configurable in the ediscovery information database 52. Changing this configuration will affect how small the pieces are that stream through the ediscovery process. It is noted that as individual family groups (file and their attachments) of documents are processed the individual groups are moved to the filtering stage regardless of the status of the rest of the batch of documents. At stage 4 filtering occurs on the family groups.

Figure 7A:
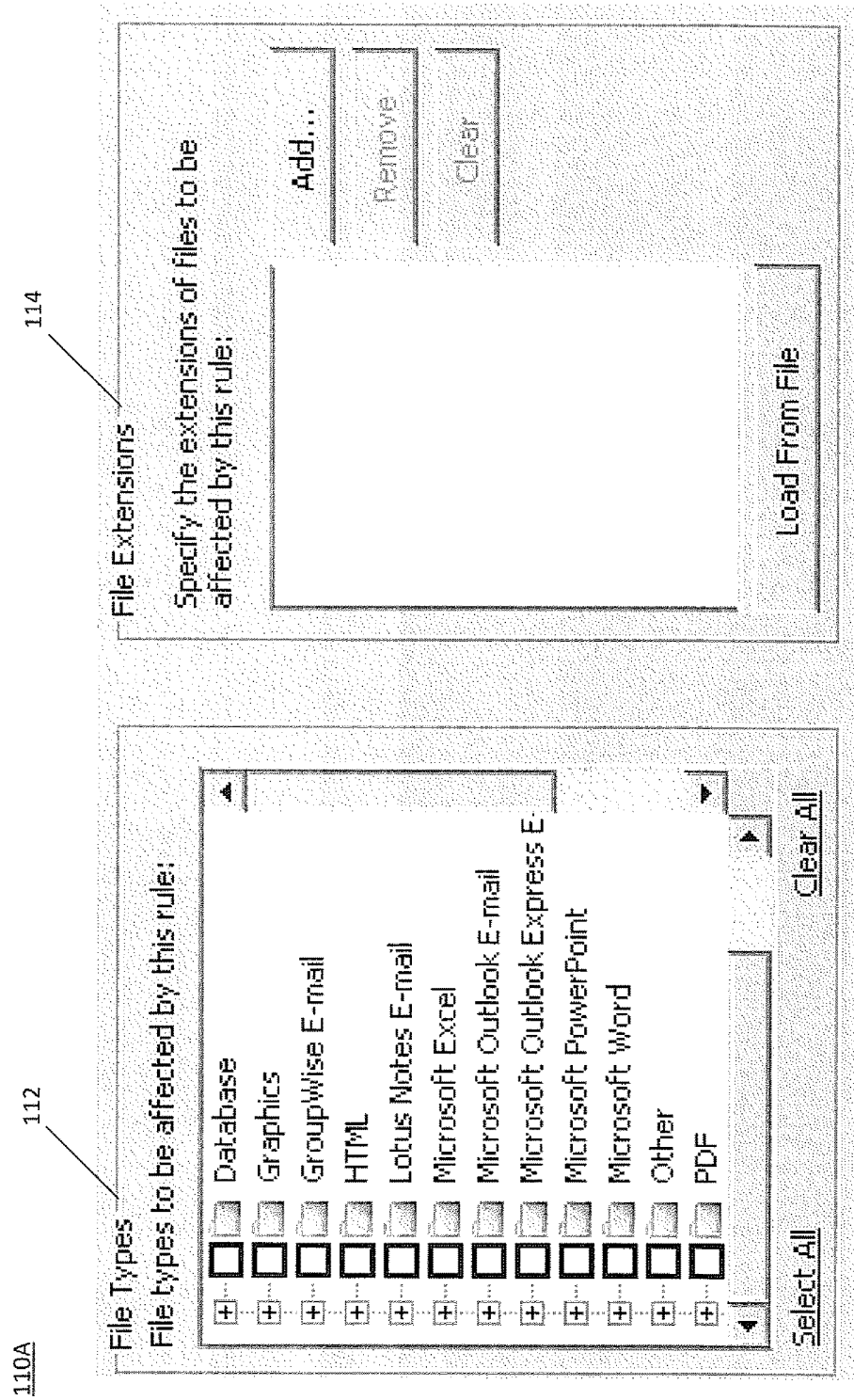
FIGS. 7A and 7B are screenshots of the GUI showing filter setting menus for setting up data filtering and culling options during the streaming ediscovery process in accordance with embodiments of the invention.
Figure 7B:
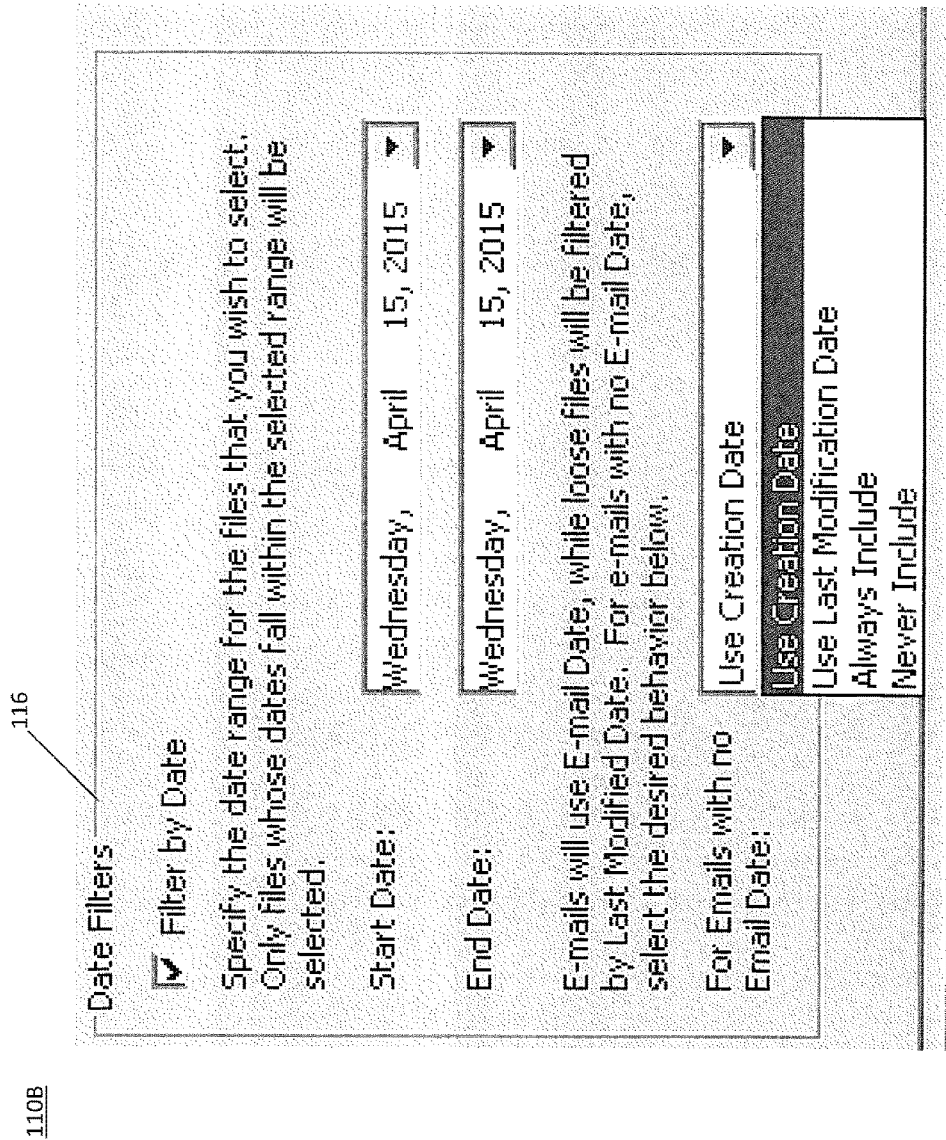

Documents flow through as a family unit and have the filters 20 applied at stage 4. Filter criteria are set via the filter setting menus that are shown in FIGS. 7A and 7B for setting up data filtering and culling options during the streaming ediscovery process. The filter settings are done up front prior to introducing the storage media for copying as noted above. The filters that are applied at this time include but are not limited to de-duplication, date, file type, and file extension (set in FIG. 8A). As documents pass through the filter 20, the documents that meet the filter criteria will move on and will be pushed to the review platform 54.

Figure 10:
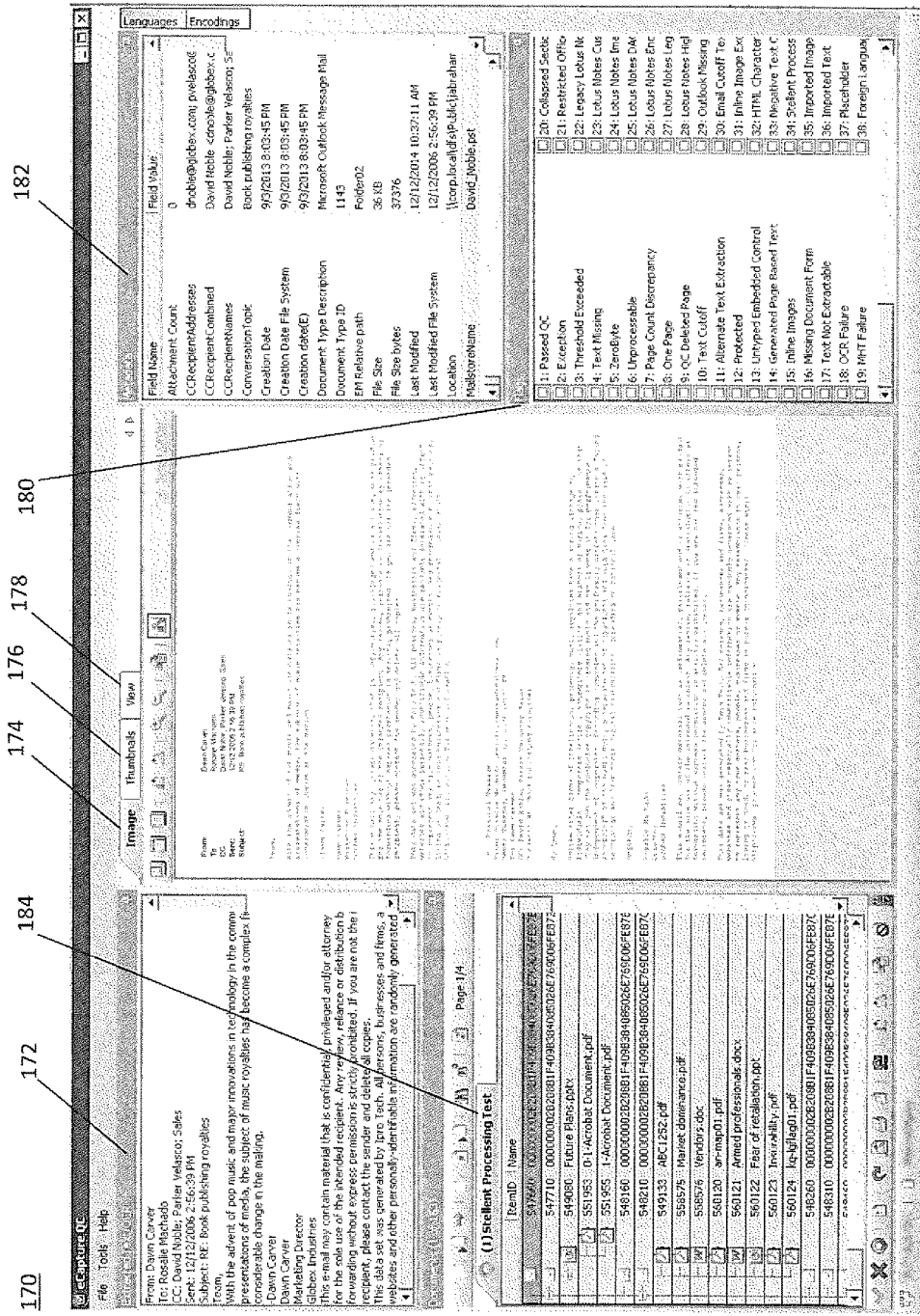
FIG. 10 shows a screenshot of a quality control (QC) Module application interface that is used to inspect and repair unsatisfactory processing results during the streaming ediscovery process in accordance with embodiments of the invention.

A manual error remediation process may be performed by the human (H) technician at stage 5, if necessary, in the QC module shown as function block 70 and in FIG. 10. Errors will be queued for the technician to remediate. These errors do not affect the progress of the rest of the batch. These errors only affect the progress of the directly attached family members of the error document. Thus unlike existing ediscovery systems, error documents do not hold back export of the rest of the files by continuing the streaming of non-error documents to the next stage in the process. Typically these errors are a very small percentage of the overall document population. As errors are remediated the data will continue through the current discovery workflow automation.

At stage 6, documents will stream into the review system 54 when triggered by a system event such as a status change of client, case, custodian, saved search, document or document batch, or the elapsing of a configurable timer that is adjusted with a graphical user interface such as the embodiment shown in FIG. 11. The scheduler and queue manager 66 will create tasks for the current discovery worker to export documents to the review platform application 32 and block 54. The export task will create a load file based on the user defined project settings for the subset of documents streaming throughout process. The export task will also output document text for the associated records as well as a pointer to the extracted native files. After the export task has been completed, the discovery worker service application/automated digital discovery 68 will push that output into the selected review platform 54. When a timer fires as set in for the auto-load interval for data to the document review system as shown in FIG. 11, documents that have met the filter requirements and have processed will automatically be pushed to the review platform 54. It should be noted that unlike existing ediscovery systems, there are no stoppages that occurs in the inventive ediscovery system since export settings are entered up front and stored for use by the system when it needs the information. Export to storage or loading to the external document review system is also automated, which avoids human effort and work flow stoppage.

FIG. 4 is a block diagram demonstrating the physical movement of data across physical computer locations of a system 40 to implement embodiments of the invention. The system 40 includes a media copy station 44, data processing file storage 46, data processing application server 50, and technician workstation 48 for quality inspection. The media copy station 44 is used to connect to and copy data from the media 42 typically obtained during the data collection phase of the ediscovery process which contains the evidence data. The data processing file storage 46 is typically network accessible storage where evidence data is copied and prepared for processing. The data processing server 50 is where the application component(s) are installed and run to perform the data processing. The various components of the ediscovery system, including subcomponents and/or functions of the ediscovery system of FIG. 4, may be integrated into a single machine, or most likely comprise multiple interconnected systems.

Figure 5:
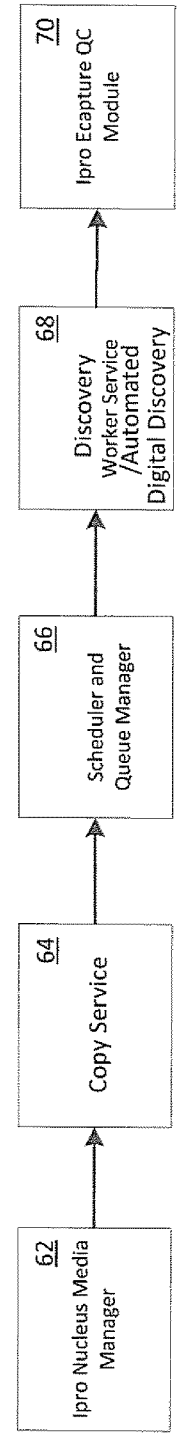
FIG. 5 is block diagram showing the flow of data across the streaming ediscovery software component in accordance with embodiments of the invention.

FIG. 5 is block diagram showing the flow of data across the inventive streaming ediscovery software component 60. The software components includes a media manager 62, copy server 64, scheduler and queue manager 66, and discovery worker service/automated digital discovery 68 are installed and run on one or more of the data processing server hardware components 50. The technician workstation 48 is used by an individual technician that is performing the ediscovery data processing to access data, and utilizes software to perform ediscovery data processing operations. The QC module 70 is installed on the technician workstation hardware component 48.

Figure 6A:
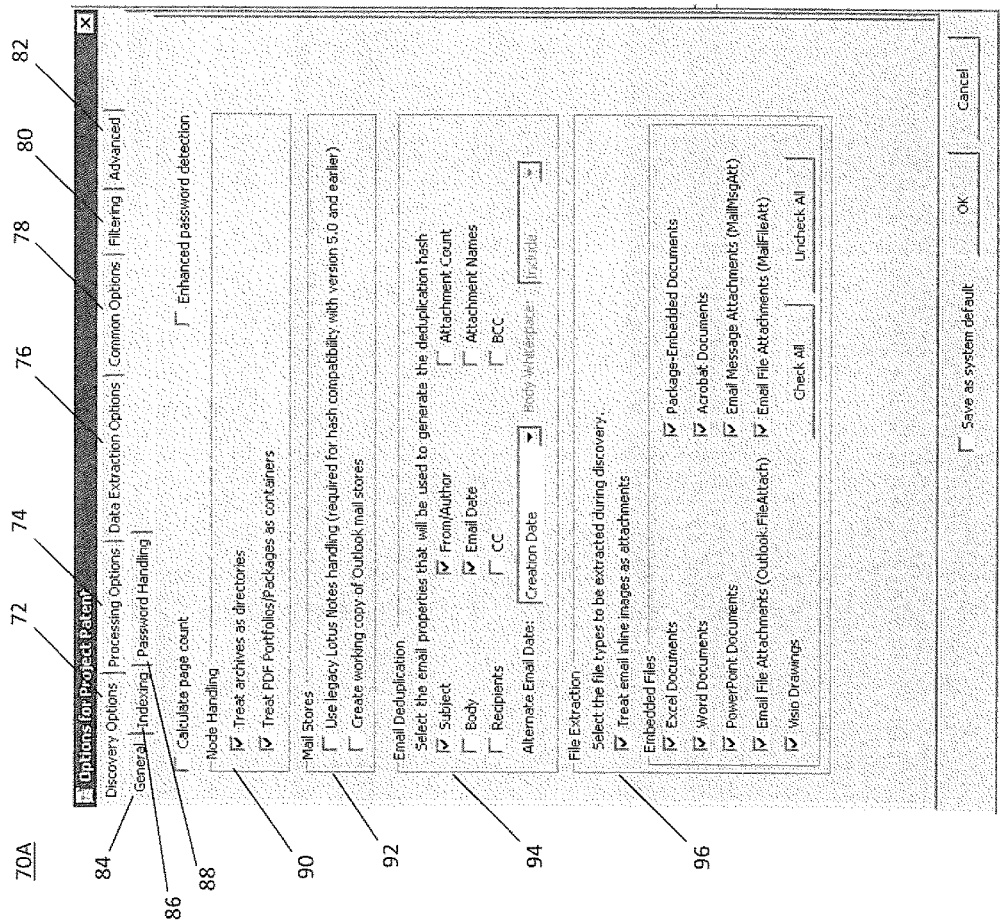
FIGS. 6A and 6B are screenshots of the graphical user interface (GUI) showing streaming ediscovery process setting parameter menus in accordance with embodiments of the invention.
Figure 6B:
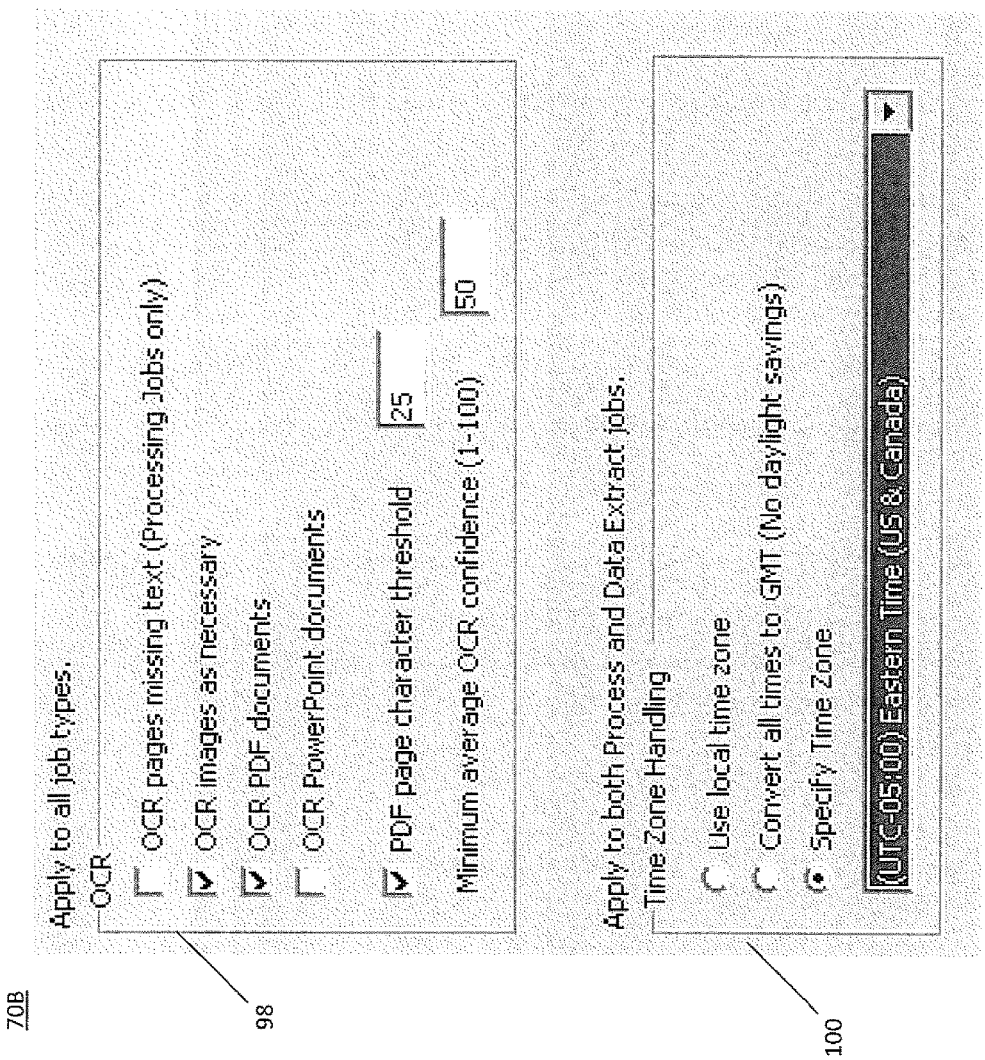

FIGS. 6A and 6B are screenshots of the graphical user interface (GUI) showing streaming ediscovery process setting parameter menus (70A, 70B) in accordance with embodiments of the invention. The ediscovery parameter setting menus of page 70A includes a series of tabs for selecting option menus that are used to set criteria to employ during the ediscovery process. The tabs used to select the option menus illustratively include discovery options 72, processing options 74, data extraction options 76, common options 78, filtering options 80, advanced options 82, general 84, indexing 86, and password handling 88. The screenshot 70A shown in FIG. 6A shows the general tab 84 selected with the following sections displayed: node handling 90, mail stores 92, email deduplication 94, and file extraction parameters 96. Within each of the aforementioned sections a series of check boxes may be selected to set criteria in each of the sections. FIG. 7B which shows screenshot 70B which has sections for setting optical character recognition (OCR) parameters in OCR section 98 and a time setting section 100 to specify the time and time zone location where the system that is performing the ediscovery.

FIGS. 7A and 7B are screenshots of the GUI showing filter setting menus (110A, 110B) for setting up data filtering and culling options during the streaming ediscovery process in accordance with embodiments of the invention. As shown in screenshot 110A of FIG. 7A, file type section 112 is used to select which file types to filter form the inputted media. File extension menu section 114 may be used to add file extensions to the filter criteria. FIG. 7B shows a date filter screen menu 110B that may be used to filter electronically stored information (ESI) by a user selected date range.

Figure 8A:
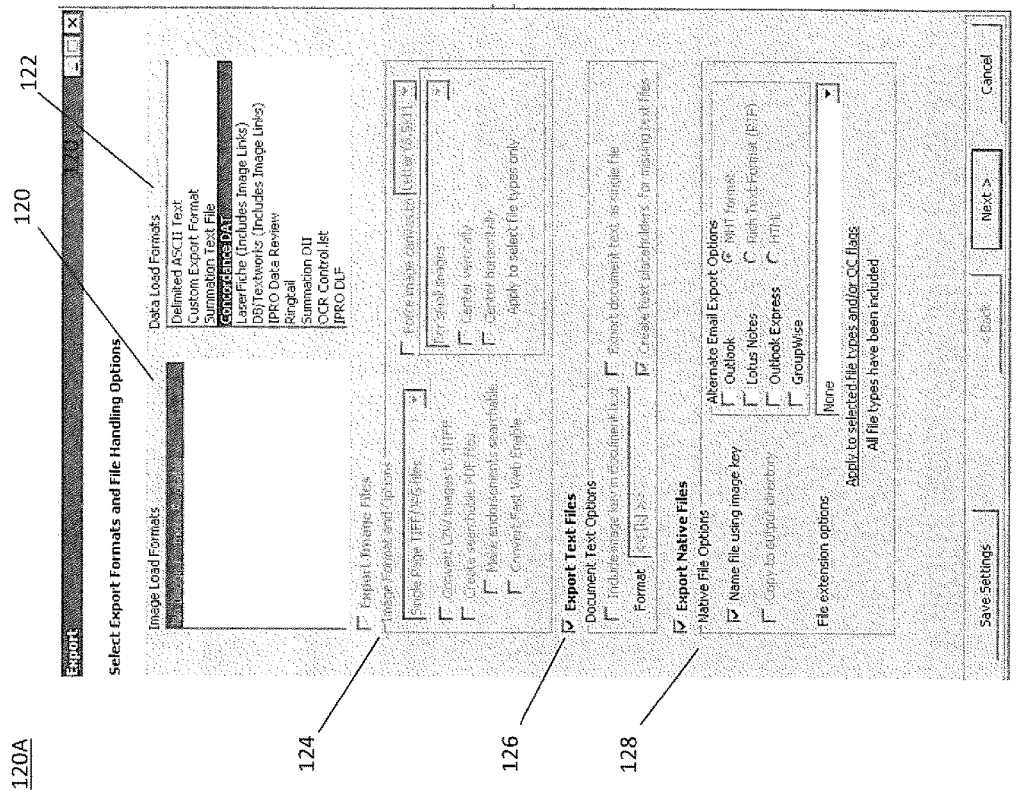
Figure 8B:
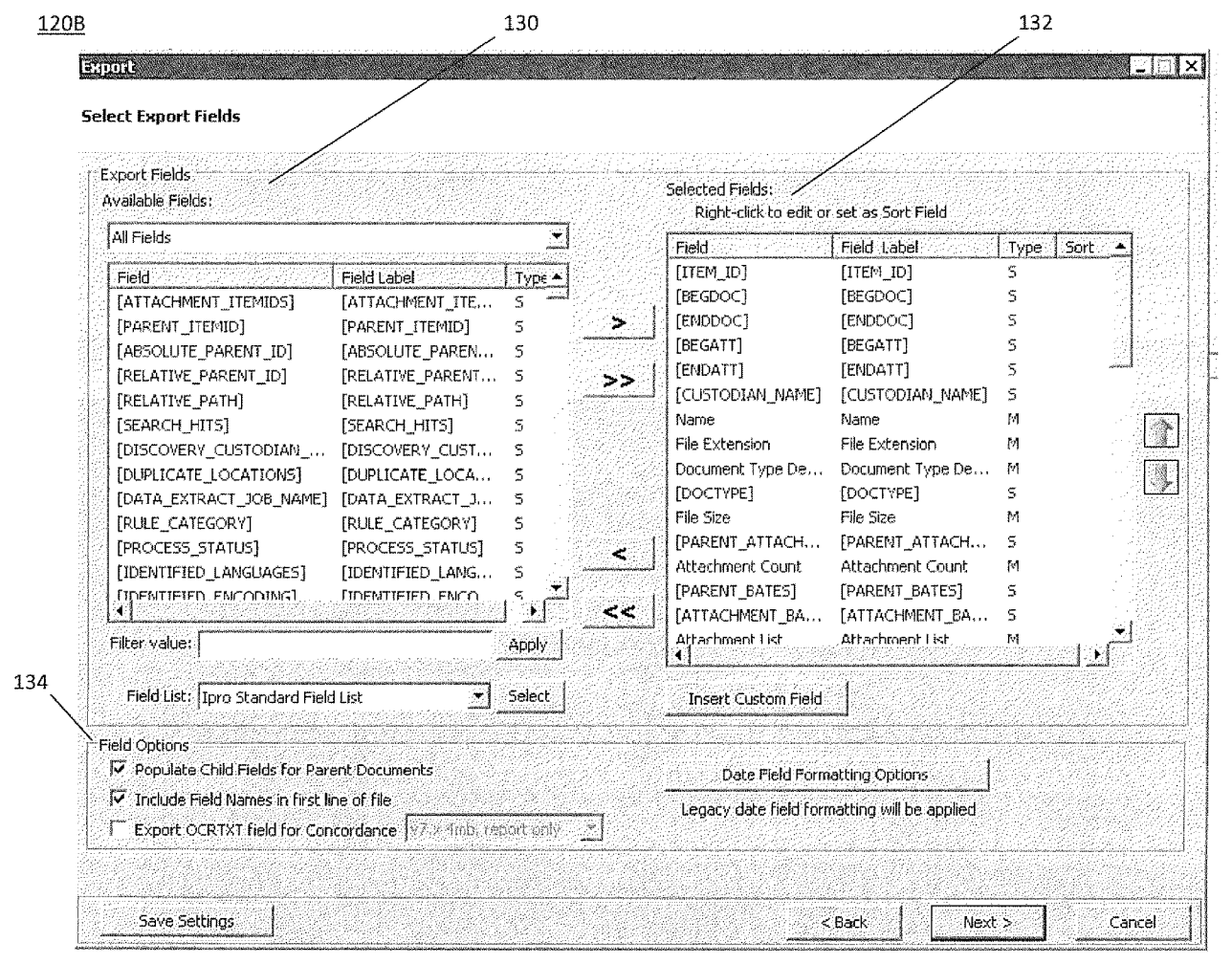
Figure 8C:
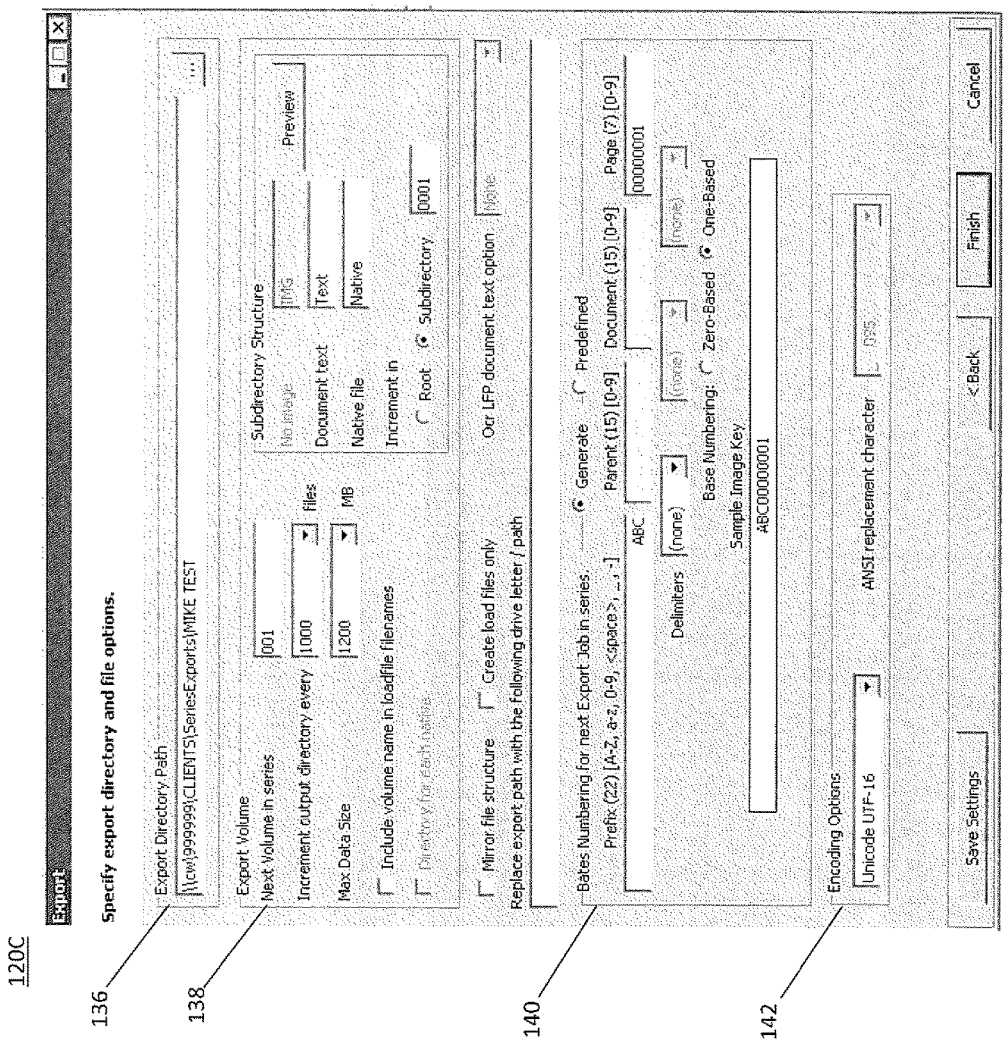
Figure 8D:
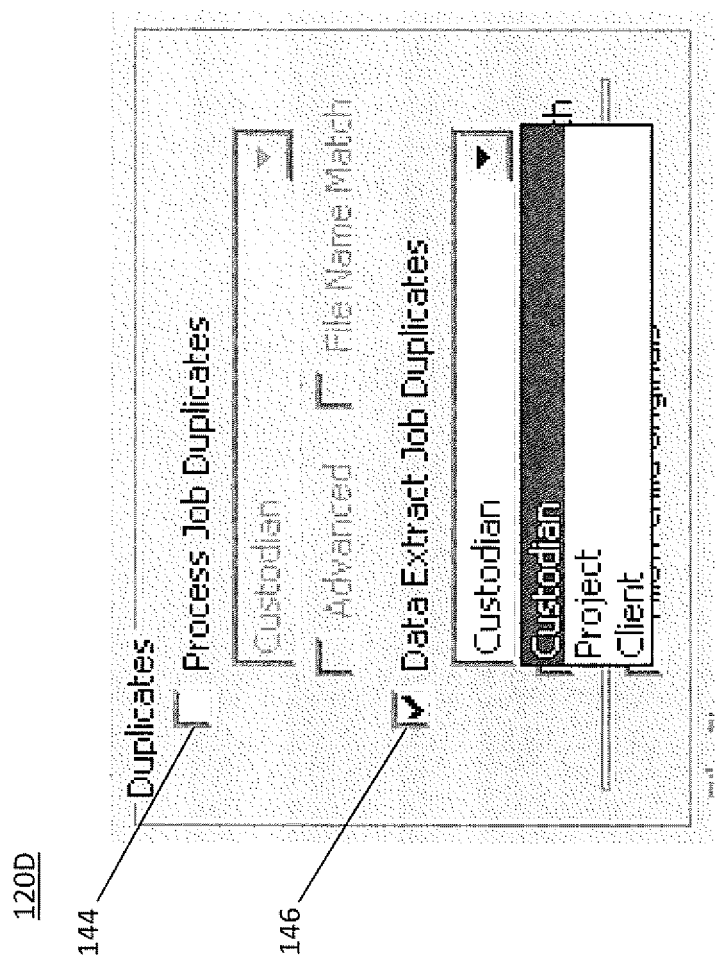

FIGS. 8A-8D are a series of screenshots (120A, 12013, 120C, 120D) of the GUI that allow a user to set up data export options for exporting data to external locations for storage or analysis) or directly to analysis software in accordance with embodiments of the invention. FIG. 8A shows screenshot 120A that may be used to select export formats and file handling options. The user may choose image load formats 120 and data load formats 122. Export image files section 124 (which is not highlighted in view since there are no image available for export) is used to select image file formats. Additional sections included are a section for exporting text files 126 and exporting native files 128. The screenshot 12013 of FIG. 813 is used to select export fields by selected from an available list of fields in section 130 and moving the selected fields to a list of selections in section 132. Section 134 allows the user to set options for the fields. The screenshot 120C of FIG. 8C is used to specify export directory and file options. Section 136 may be used to specify an export directory path with a user fillable field. Section 138 may be used to specify export volume parameters. Section 140 may be used for setting Bates numbering for the next export job in a series. Section 142 is used for setting encoding options. FIG. 8I) show a screenshot 120D for setting how to handle duplicates during export.

Figure 9:
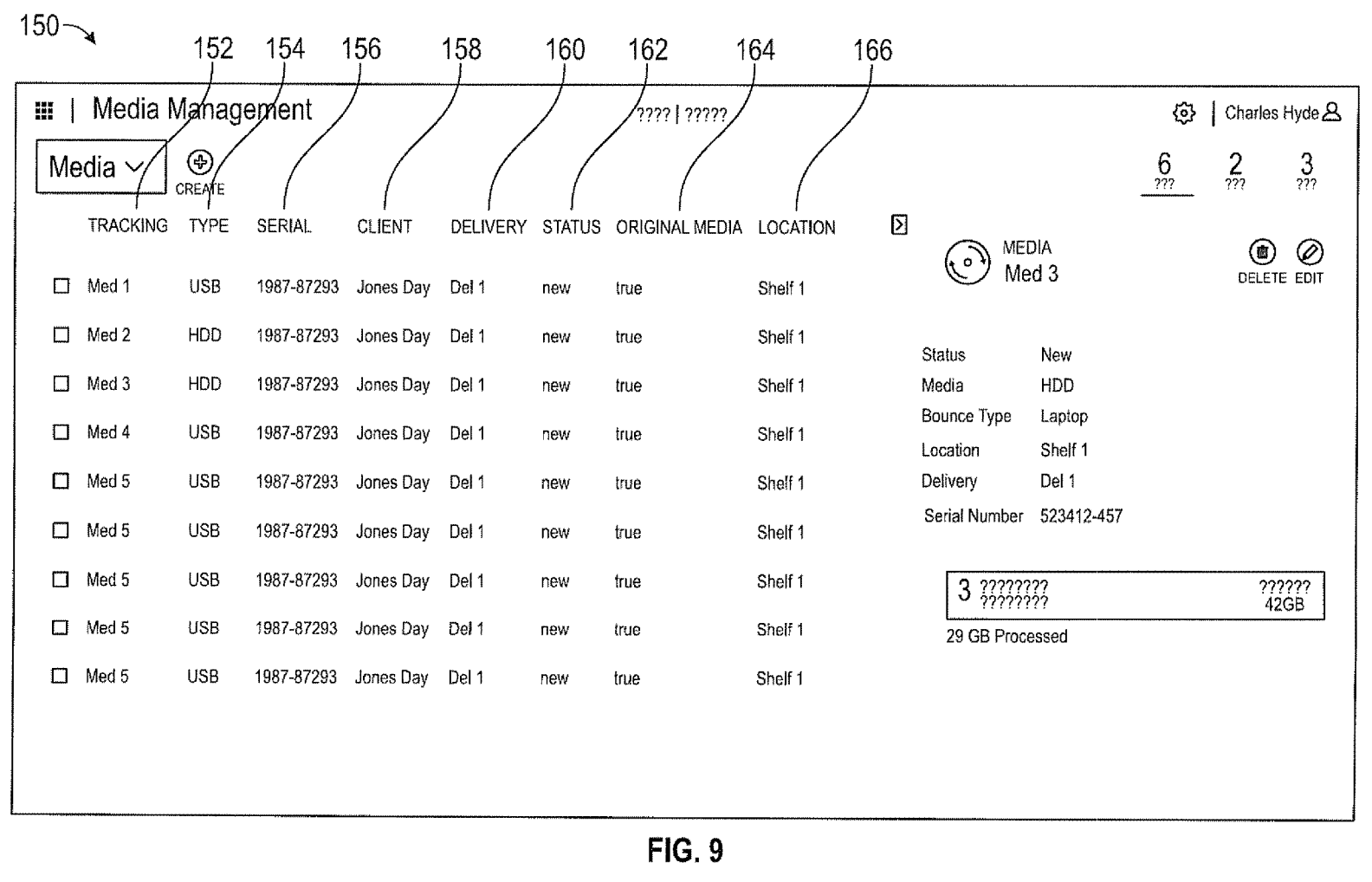

FIG. 9 shows a media manager application interface display 150 for logging and tracking media related to evidence data used in the streaming ediscovery process for facilitating an automated workflow in accordance with embodiments of the invention. A listing of available media is organized in a table with columns for tracking number 152 assigned to the media source, type of media source 154, serial number assigned to media source 156, client for whom source media is being analyzed or to whom source material belongs 158, delivery 160, status 162, original media recorded on or transferred to different form of media 164, and the physical location of media 166.

FIG. 10 shows a screenshot of a quality control (QC) Module application interface 170 that is used to inspect and repair unsatisfactory processing results during the streaming ediscovery process in accordance with embodiments of the invention. Available user viewable sections include extracted text/OCR 172; a section for selecting a piece of ESI displayed via an image with tab 174, a thumbnail listing 176 or other type of view 178; a section to set flags for quality control events 180; metadata information for ESI under quality control 182; and stellent processing test results 184.

FIG. 11 shows a screenshot of an interface 190 for configuring the auto-load interval for data based on a time trigger to the document review system in accordance with embodiments of the invention. It is noted that the trigger to stream documents or batches of related ESI to the review system 54 may also be triggered by a system event such as a status change of client, case, custodian, saved search, document or document batch, or with the elapsing of a configurable timer that is adjusted with a graphical user interface as is shown in FIG. 11

Figure 13:
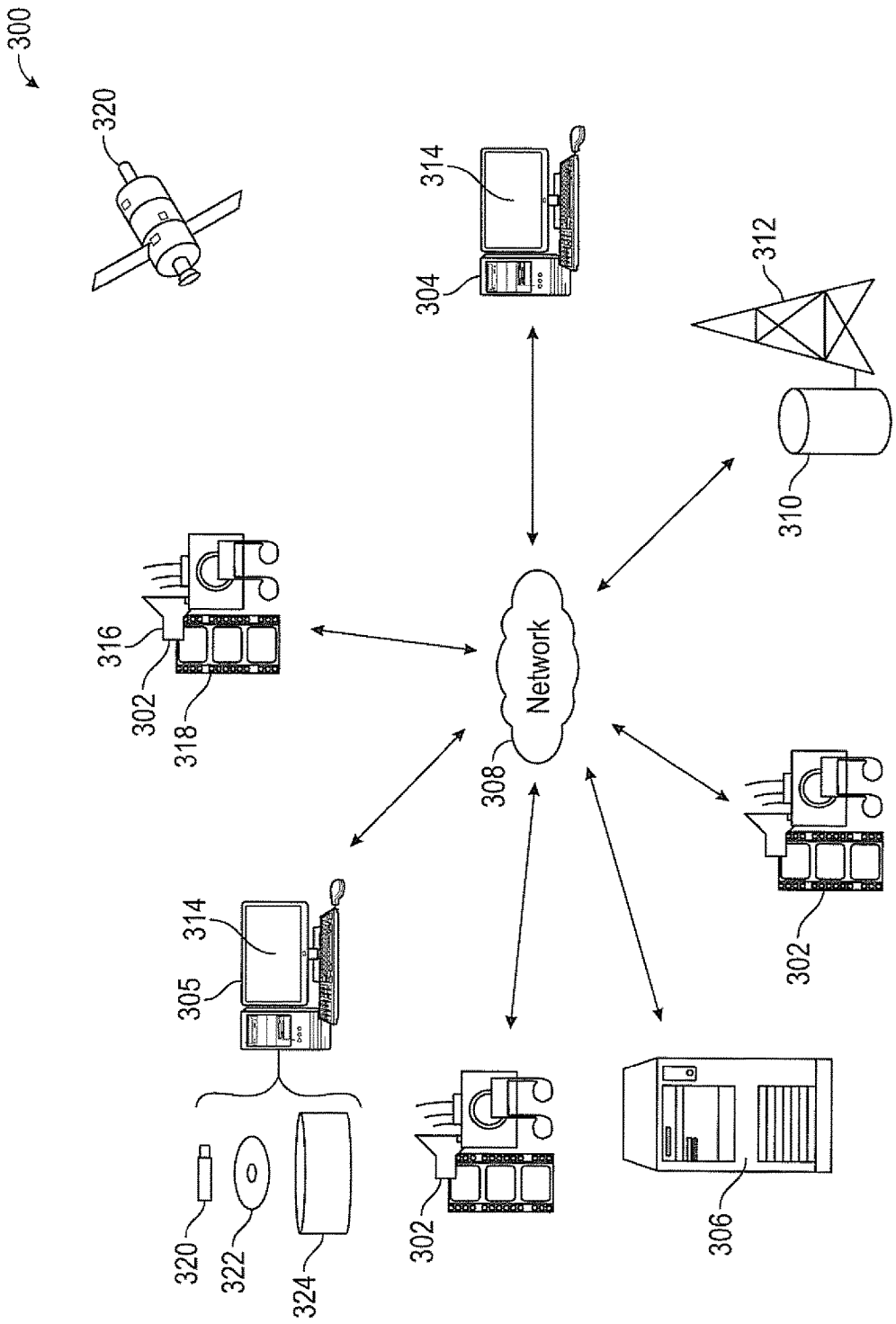
FIG. 13 is a schematic diagram illustrating an overall view of communication devices, computing devices, and mediums for implementing embodiments of the invention.

FIG. 12 shows a screenshot 200 for an interface for selecting data for parallel copying and streaming data processing, and for export/transmittal to storage or document review systems in accordance with embodiments of the invention; and FIG. 13 is a schematic diagram illustrating an overall view of communication devices, computing devices, and mediums for implementing the ediscovery software platform according to embodiments of the invention. The elements of the embodiments of FIGS. 1-12 are included in the networks and devices of FIG. 13.

The system 300 includes multimedia devices 302 and desktop computer devices 304 configured with display capabilities 314 and processors for executing instructions and commands. The multimedia devices 302 are optionally mobile communication and entertainment devices, such as cellular phones and mobile computing devices that in certain embodiments are wirelessly connected to a network 308. The multimedia devices 302 typically have video displays 318 and audio outputs 316. The multimedia devices 302 and desktop computer devices 304 are optionally configured with internal storage, software, and a graphical user interface (GUI) for carrying out elements of the platform according to embodiments of the invention. The network 308 is optionally any type of known network including a fixed wire line network, cable and fiber optics, over the air broadcasts, satellite 320, local area network (LAN), wide area network (WAN), global network (e.g., Internet), intranet, etc. with data/Internet and remote storage capabilities as represented by server 306. Communication aspects of the network are represented by cellular base station 310 and antenna 312. In a preferred embodiment, the network 308 is a LAN and each remote device 302 and desktop device 304 executes a user interface application (e.g., Web browser) to contact the server system 306 through the network 308. Alternatively, the remote devices 302 and 304 may be implemented using a device programmed primarily for accessing network 308 such as a remote client. The network 308 may be accessed by the user during an ediscovery operation to reach online help.

The software for the platform, of embodiments of the invention, may be resident on a USB thumb or flash drive 320, CD or DVD 322, or an external hard drive 324 for connection to desktop or laptop computers 304, or stored within the server 306 or cellular base station 310 for download to an end user. Server 306 may implement a cloud-based service for implementing embodiments of the platform with a multi-tenant database for storage of separate client data that may be transferred during an ediscovery operation from a computer or laptop 304.

Embodiments of the present invention are described partly in terms of functional components and various processing steps. Such functional components and processing steps may be realized by any number of components, operations, and techniques configured to perform the specified functions and achieve the various results. For example, the present invention may employ various data sources, data processing server configurations, user work stations, database servers and storage systems, and the like, which may carry out a variety of functions. In addition, although the invention is described in the ediscovery data processing context, the present invention may be practiced in conjunction with any number of applications, environments; the systems described are merely exemplary applications for the invention.

The foregoing description is illustrative of particular embodiments of the invention, but is not meant to be a limitation upon the practice thereof. The following claims, including all equivalents thereof, are intended to define the scope of the invention.

The invention claimed is:

1. A computer-implemented method for electronic discovery processing to speed processing of electronically stored information (ESI) in an electronic discovery system, the method comprising:
   receiving, at a first computing device configured as an application server, a set of electronic discovery project requirements and filter requirements;
   pre-configuring, via entry of the set of electronic discovery project requirements and filter requirements, the electronic discovery system to avoid stoppages during processing the ESI;
   reading, after the pre-configuring and at a second computing device configured as a media copy station, an attached storage medium to obtain ESI stored on the storage medium, the ESI comprising a directory structure having a plurality of subdirectories; and
   copying, by the second computing device, a selection of the ESI to a data processing file storage of a third computing device configured as a network attached file server,
   wherein, as individual subdirectories of the selection of ESI complete the copy process, the individual subdirectories are inserted, by a fourth computing device configured as a data processing application server, in parallel into an ediscovery processing job that is performed by a discovery worker service/automated digital discovery module operative on the fourth computing device, and wherein, to speed processing of the selection of the ESI in the electronic discovery system, the ediscovery processing of the individual subdirectories begins while the copying the selection of the ESI is being performed.

2. The method of claim 1, wherein the set of discovery project requirements and filter requirements are inputted via a graphical user interface (GUI).

3. The method of claim 1, wherein the filter requirements comprise at least one of de-duplication, date, file type, and file extension.

4. The method of claim 1, wherein the selection of ESI is based on a report generated by a media manager application operative on the second computing device when the storage medium is logged and registered for chain of custody tracking.

5. The method of claim 1; wherein the discovery worker service/automated digital discovery module takes the individual subdirectories, and breaks the subdirectories into one or more group tasks; and wherein the one or more group tasks extract files, extract metadata, and extract document text to the data processing file storage.

6. The method of claim 5, wherein the extracted files, the extracted metadata, and the extracted document text are written to an ediscovery information database coupled to the fourth computing device.

7. The method of claim 5; wherein a size for each of the one or more group tasks is configurable in the ediscovery information database.

8. The method of claim 5, wherein the ediscovery processing further comprises applying one or more filters configured with the filter requirements on the extracted files, the extracted metadata, and the extracted document text.

9. The method of claim 8, further comprising exporting, by the fourth computing device and responsive to operation of the automated digital discovery module, portions of the extracted files, the extracted metadata, and the extracted document text that meet the filter criteria to a review platform operative on a fifth computing device.

10. The method of claim 9, wherein the review platform further comprises a quality control (QC) module to queue errors for remediation, and wherein responsive to an error occurring only a portion of the extracted files, the extracted metadata, and the extracted document text associated with an error are held for remediation, and the remainder of the extracted files, the extracted metadata, and the extracted document text continue in the ediscovery processing without waiting for the remediation of the error to complete.

11. The method of claim 9, wherein the portions of the extracted files, the extracted metadata, and the extracted document text that meet the filter criteria are exported to the review platform when triggered by an event, and wherein the event comprises at least one of a status change of a client, a case, a custodian, a saved search, a document or a document batch, or the elapsing of a configurable timer.

12. The method of claim 1, wherein the pre-configuring further comprises entering export requirements into the electronic discovery system.

* * * * *